United States Patent [19]

Lumley et al.

[11] Patent Number: 5,746,478
[45] Date of Patent: May 5, 1998

[54] RECLINING MECHANISM AND LATCH FOR CHILD SAFETY SEAT

[75] Inventors: Micheal Andrew Lumley; Wieslaw Peter Maciejczyk, both of Sunshine, Australia

[73] Assignee: Britax Child-Care Products Pty Ltd, Sunshine, Australia

[21] Appl. No.: 743,976

[22] Filed: Nov. 7, 1996

[30] Foreign Application Priority Data

Nov. 10, 1995 [AU] Australia ................. PN6495

[51] Int. Cl.⁶ ........................................ A47C 1/08
[52] U.S. Cl. ........................ 297/256.13; 297/250.1
[58] Field of Search ................. 297/250.1, 256.1, 297/256.13, 328, 329

[56] References Cited

U.S. PATENT DOCUMENTS

| | | | |
|---|---|---|---|
| 3,669,492 | 6/1972 | Peterson | 297/329 X |
| 4,632,456 | 12/1986 | Kassai | 297/328 |
| 4,915,446 | 4/1990 | Darling et al. | 297/256.13 X |
| 5,052,750 | 10/1991 | Takahashi et al. | 297/256.13 |
| 5,181,761 | 1/1993 | Meeker | 297/328 X |
| 5,286,085 | 2/1994 | Minami | 297/250.1 |
| 5,335,964 | 8/1994 | Sedlack et al. | 297/256.13 |
| 5,380,062 | 1/1995 | Nania | 297/329 X |

FOREIGN PATENT DOCUMENTS

| | | |
|---|---|---|
| 2 687 960 | 9/1993 | France . |
| 2 706 827 | 12/1994 | France . |
| 35 05 010 | 8/1986 | Germany . |
| 212063 | 3/1924 | United Kingdom . |

*Primary Examiner*—Milton Nelson, Jr.
*Attorney, Agent, or Firm*—Davis and Bujold

[57] ABSTRACT

A reclining mechanism for a child safety seat used in motor vehicles that enables the safety seat to be used in both a forward and rearward facing position. The reclining mechanism comprises a seat (11), a base member (15) to which the seat (11) is attached, a connection (19, 22) between the seat (11) and base member (15) that allows movement of the seat (11) with respect to the base (15). The movement comprises a first range of reclining movement where the seat (11) is able to move between an upright position and a first recline position, and a second range of reclining movement where the seat further moves between the first reclined position and a second reclined position. A stop (33) prevents the seat (11) moving from the first reclined position into the second range of reclining movement. The stop (33) requires manual operation or manipulation of the seat (11) to allow release of the seat (11) into the second range of reclining movement. This allows a minor amount of reclining of the seat (11) while restraining the seat (11) from fully reclining which may be dangerous when in the forward facing position. The fully reclined position is only when the child safety seat is used in a rearward facing position.

19 Claims, 4 Drawing Sheets

RECLINING MECHANISM AND LATCH FOR CHILD SAFETY SEAT

BACKGROUND OF THE INVENTION

Child safety seats for motor vehicles normally comprise two styles of seats. The first is used for infants from birth to the age of six months. These seats are normally referred to as "rearward facing seats". The seats are positioned in a motor vehicle with the infant facing in a rearward direction so that the infant's back faces the direction of travel of the vehicle. In a front end collision, the force of the impact will be absorbed by the backrest of the safety seat.

From the ages of six months to four and a half years, the style of seat recommended is forward facing with the child being seated in an upright position. Such safety seats have their own harnesses and safety belts for the child. The seat in turn is secured to the motor vehicle seat by way of the existing lap sash seat belt or other attachment arrangements.

Obviously, it is desirable to have a safety seat which can be used in both the rearward and forward facing mode. In order to achieve this, the safety seat must be designed so that it can be used in an upright forward facing mode, and also in a reclined rearward facing mode. Obviously, there needs to be some adjustment between the safety seat and its base support, which rests on the motor vehicle seat, to enable the various positions to be achieved.

In addition, it is desirable to be able to recline an upright forward facing seat for the comfort of a sleeping child. There are limits to the extent of which a forward facing seat can be reclined. If it is reclined too excessively, then there is potential for "tunnelling" which is forward movement of the child's body with respect to the harness under impact conditions causing high loading on the lower body. Apart from the potential for the child to come out of the harness, there is the risk of serious injury if the waist harness presses against the middle or upper abdomen. Accordingly, it is essential that the reclining of a forward facing safety seat be limited.

It is an object of this invention to provide a child safety seat which meets the abovementioned requirements. In addition, it is an object of the invention to provide a reclining mechanism which is easy to operate while at the same time having a high degree of safety.

SUMMARY OF THE PRESENT INVENTION

In its broadest form, the invention is a reclining mechanism for a child safety seat that enables said safety seat to be used in both a forward and rearward facing position in a motor vehicle comprising:

a seat, a base member for attachment of said seat thereto, connection means between said seat and base member that allow movement of said seat with respect to said base, said movement comprising a first range of reclining movement where said seat is able to move between an upright position and a first reclined position, and a second range of reclining movement where said seat further moves between said first reclined position and a second reclined position, and stop means that prevents said seat moving from said first reclined position to said second range of reclining movement, said stop means being manually operable to allow release of said seat into said second range of reclining movement.

Preferably the reclining mechanism comprises a latch mechanism that can be used to both hold the seat in predetermined positions, and release the seat for movement within one or more of said ranges of reclining movement. The latching mechanism may comprise a number of arrangements including lever operated latches, or detent or recess stops in a guide slot.

The upright position and first recline position are for use with the child safety seat in its forward facing mode. The first recline position is the maximum amount of recline that would be allowable with the seat in its forward facing mode. The second recline position is the position that the safety seat needs to adopt in order for it to be used as a rearward facing safety seat and is obviously a greater degree of recline.

Preferably, the means that prevents direct movement into the second range of reclining movement comprises a stop or movement limiting device. The latch mechanism enables the safety seat to be preferably locked in a number of reclined positions between the upright position and the first recline position. The stop can be manually overridden to enable the safety seat to move into the second reclined position. Therefore, unless the stop is manually depressed or overcome, the safety seat cannot be reclined passed the first reclined position. This helps to prevent accidental over reclining when the safety seat is used in the forward facing position.

Preferably, both the seat and base member comprise unitary polymeric mouldings, and the connections between the seat and base member comprise a combination of pivoted links and guide slots which control movement between the various positions. The combination of these links and guide slots produce the required movement of the seat with respect to the base member. Additional guide slots may be used as an alternative to links.

Preferably, the latch mechanism comprises a manual latch which is sprung so that when it is released the latch re-engages. Preferably, the handle of the latch is located on a forward position of the seat which is easily accessible. As mentioned above, there are a number of latching positions between the upright position and the first recline position, and release of the handle will result in the latching mechanism re-engaging and the seat being held in the required position.

Preferably, in order to move the seat to the second recline position, both the latch mechanism and a stop mechanism need to be operated. The stop may comprise a spring loaded latch, or may comprise a branch slot that requires lifting of the front of the seat to engage the slot to allow continued movement to the second reclined position.

In order to fully understand the invention, preferred embodiments will now be described, but it should be realised that the invention is not to be limited to the precise details and arrangement of these embodiments.

DETAILED DESCRIPTION OF PREFERRED EMBODIMENTS

Figure 1:
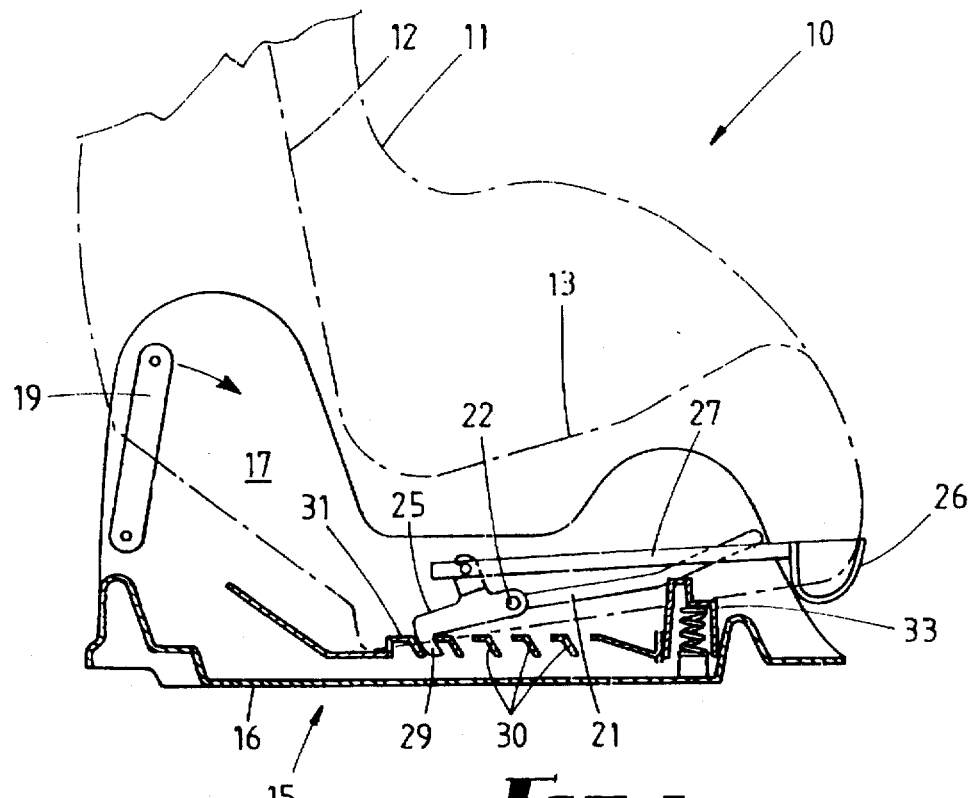
FIG. 1 shows a part cross-sectional side view of a child safety seat in an upright position.

In the embodiment shown in FIGS. 1-5, a child safety seat 10 comprises a seat 11 having a backrest 12 and a seat portion 13. The seat 11 is attached to a base member 15 which in this embodiment comprises a base wall 16 and side walls 17. The seat 11 is designed to locate between the side walls 17.

In order to hold the seat 11 with respect to the base member 15, connections are used which comprise a pair of links 19 that locate either side of the seat 11. The links 19 are pivotally attached to a respective side of the seat 11, and to a respective side wall 17.

The remaining support for the seat 11 comprises a pair of slots 21 one of which is located on the inside surface of each side wall 17. The seat 11 has a guide bar 22 attached to the seat 11 the ends of which locate within respective slots 21.

Figure 2:
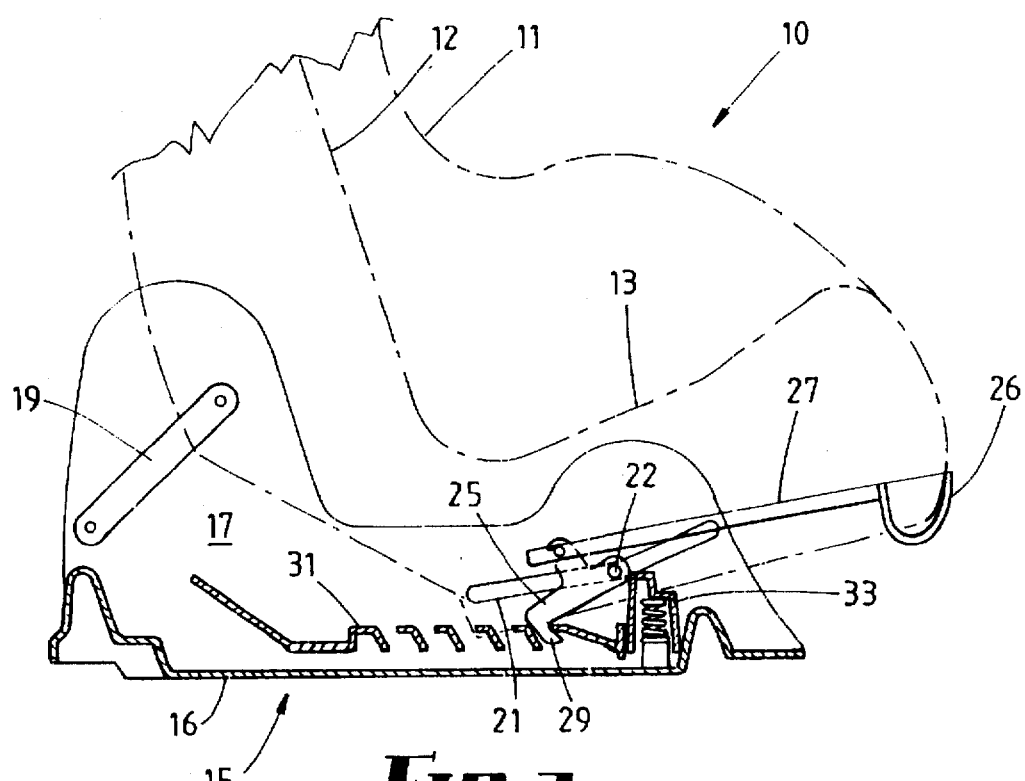
FIG. 2 shows a part cross-sectional side view of the child safety seat illustrated in FIG. 1 in a first reclined position.
Figure 4:
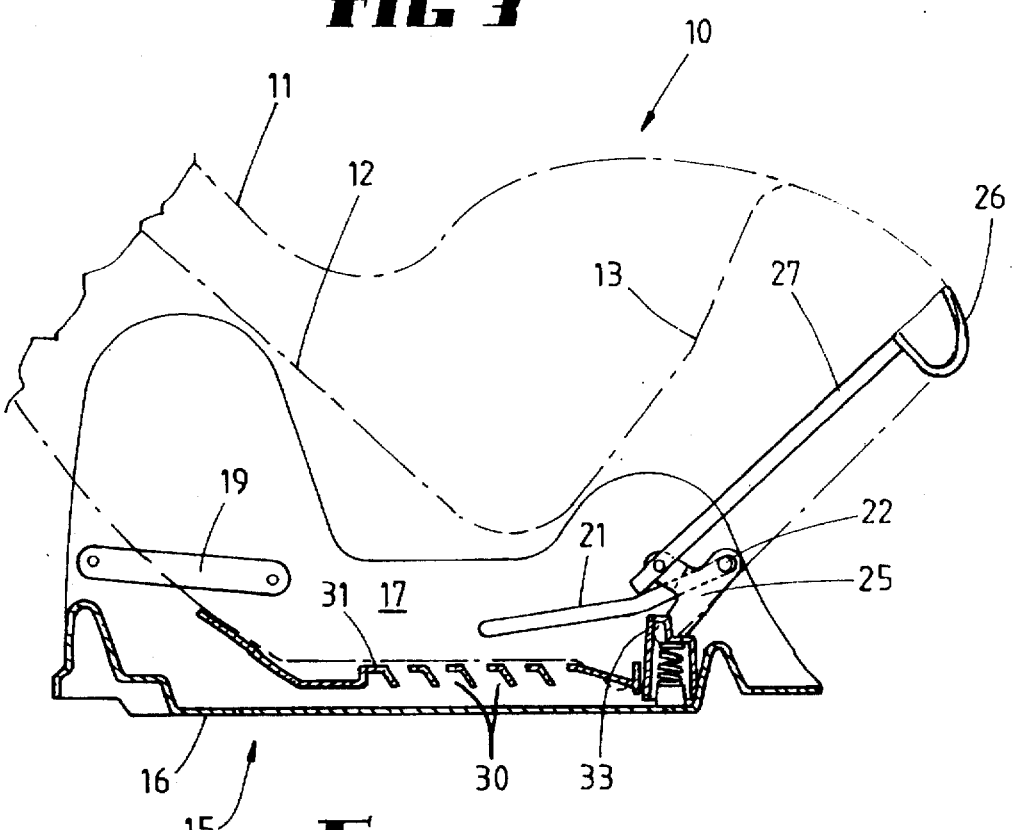
FIG. 4 shows a part cross-sectional side view of the child safety seat illustrated in FIG. 1 in a second reclined position.
Figure 5:
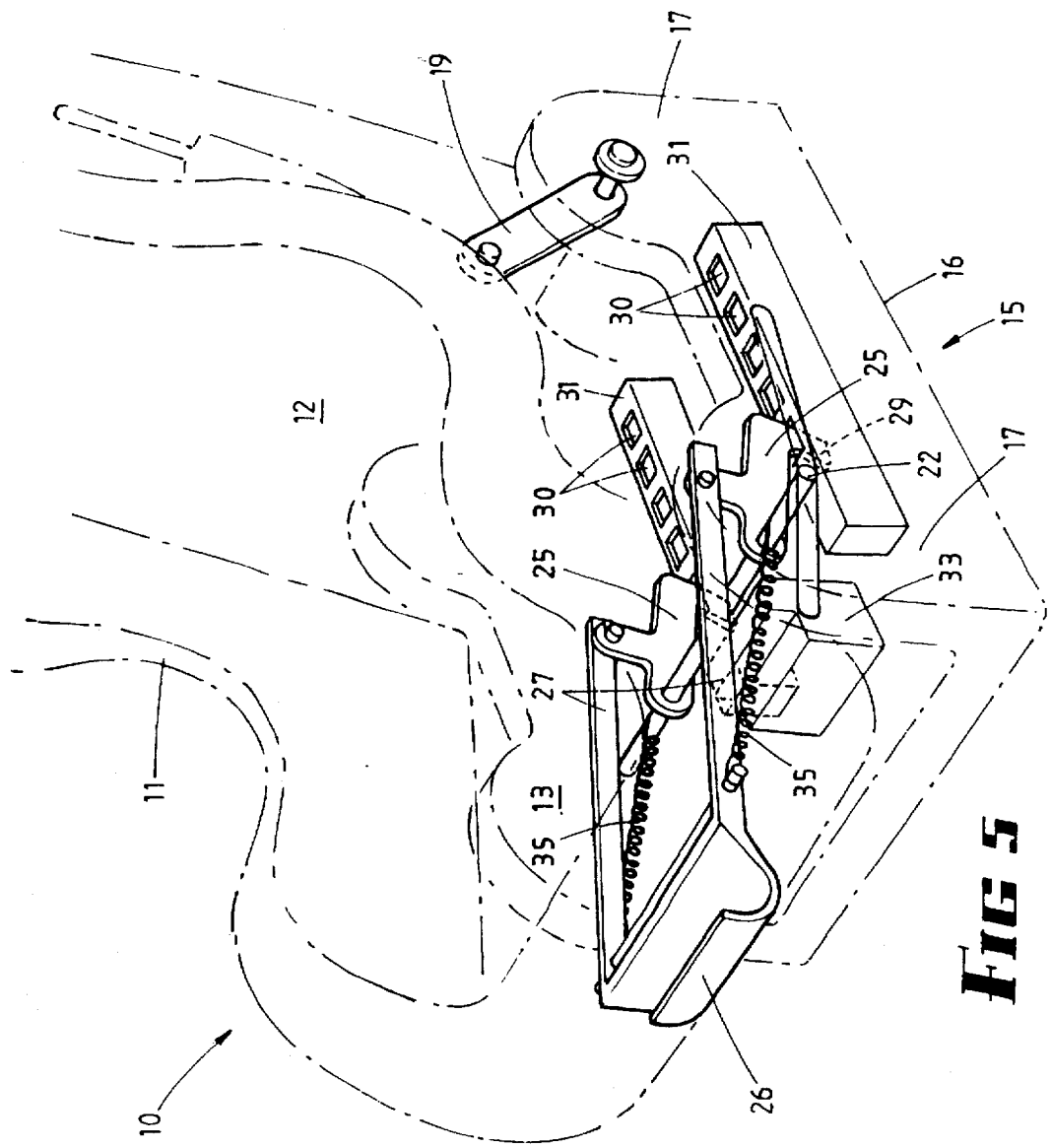
FIG. 5 shows a part cross-sectional perspective view of the child safety seat illustrated in FIG. 1, and FIGS. 6a and 6b show a second and third embodiment of a slot for control of seat reclining.

The links 19, slots 21 and guide bars 22 control the movement of the seat 11 so that it is able to assume positions shown in FIG. 1, FIG. 2 and FIG. 4.

In order to control movement of the seat 11, a pair of latching elements 25 are pivotally attached with respect to the guide bar 22. The latch elements 25 are attached to a handle 26 which is located at the forward end of the seat 13. A pair of pull rods 27 are used to attach the handle to the pair of latch elements 25. By pulling the handle 26, the latch elements 25 are rotated so that the projections 29 are withdrawn from the locking apertures 30. The locking apertures 30 are located in a pair of racks 31 which are either secured to or may be moulded into the base member 15.

Springs 35 extend between the handle 26 and the guide bar 22. These springs exert a force on the handle 26 to ensure that the latch elements 25 are returned to their latching position once the handle 26 is released.

A stop 33 is provided to prevent the seat 11 from being reclined passed the first recline position shown in FIG. 2. As seen in FIG. 2, the guide bar 22 abuts against the stop, and therefore prevents any further reclining of the seat 11.

Figure 3:
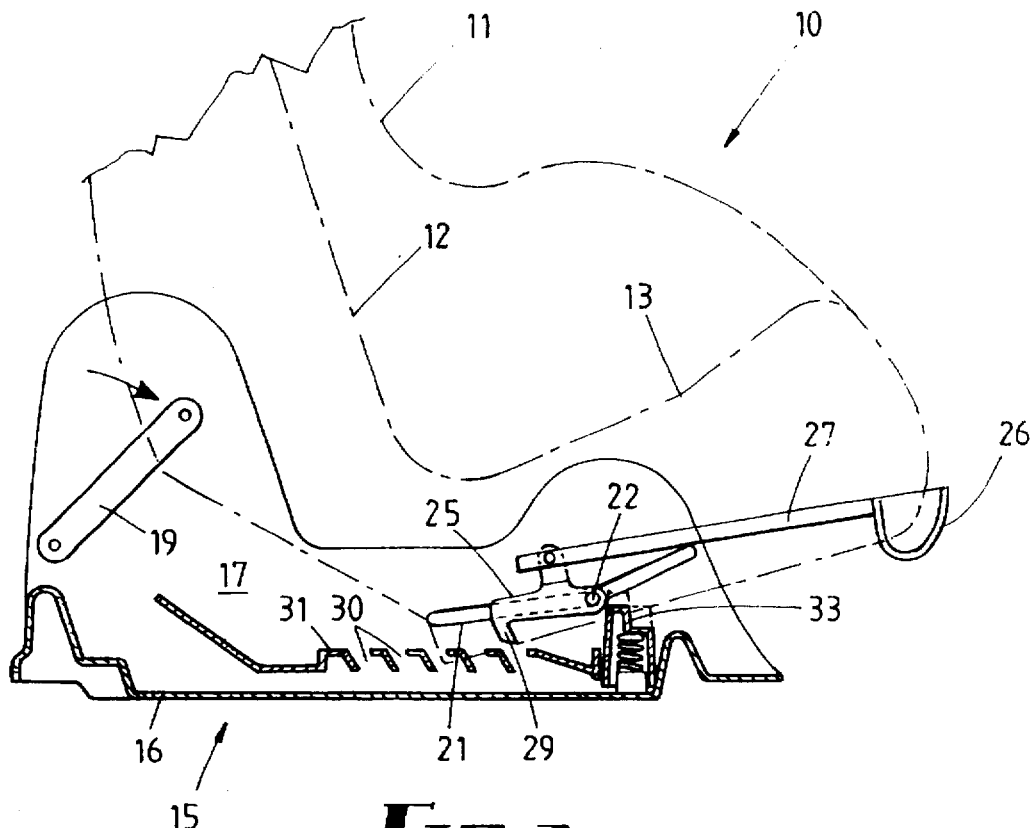
FIG. 3 shows a part cross-sectional side view of the child safety seat illustrated in FIG. 1 that shows both the latch mechanism and stop being operated to enable the safety seat to move from a first recline position to a second recline position.

In order to recline the seat to the second recline position in which the safety seat 10 can be used in a rearward facing mode, the handle 26 needs to be pulled so as to release the latch elements 25, and the stop 33, which is spring loaded, needs to be depressed as shown in FIG. 3. This then enables the guide bar 22 to move to the end of the slot 21 thereby positioning the seat 11 in the second recline position as shown in FIG. 4.

In this embodiment, both the seat 11 and base member 15 are moulded polymeric components. The links 19, guide bar 22, latch elements 25, handle 26, pull rod 27, racks 31 and stop 33 are preferably metal components that are attached to either the seat 11 or base member 15.

Figure 6A:
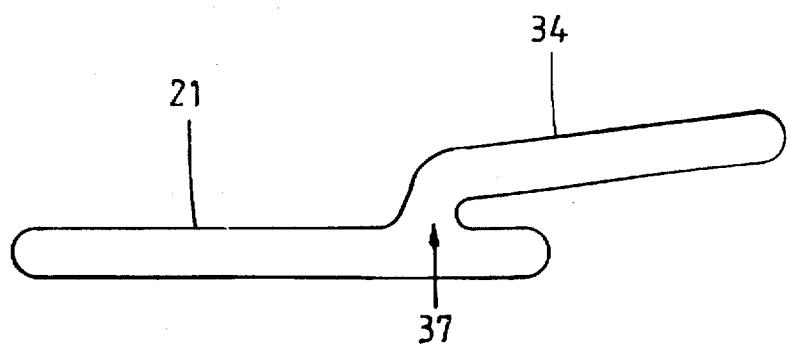

As an alternative to a spring loaded stop 33, the slot 21 may have a branch slot 34 as illustrated in FIG. 6a. This additional branch slot 34 may extend upwardly and away from the first slot portion or slot 21. The entrance to the branch slot 34 may comprise a substantially vertical aperture 37 which is located just prior to the end of slot 21. In this way, the seat 11 will travel to the end of slot 21 to the first reclined position. In order to recline the seat 11 into the second reclined position, the front of the seat 11 will need to be lifted into engagement with the aperture 37 and branch slot 34, whereupon it will be able to move to the second reclined position. As the guide bar 22 is loaded downwardly due to the weight of the occupant, the seat 11 is prevented from accidentally engaging the aperture 37 and branch slot 34.

Figure 6B:
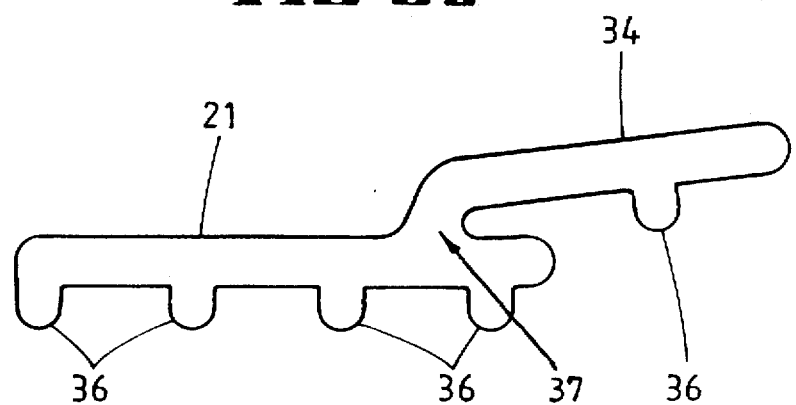

As seen in FIG. 6b, as a further variation, recesses 36 are provided as an alternative to the latch elements 25 and the handle 26. The recesses 36 are simply engaged by the guide bar 22, thereby holding the seat 11 in a set position.

As can be seen from the above description, the connections between the seat 11 and the base member and the latch element 25 provide a convenient means of reclining a safety seat when used in a forward facing mode, provides a means of preventing over reclining when used in the forward facing mode, and provides a simple means of reclining the seat 11 to a position where the safety seat 10 can be used in a rearward facing position.

We claim:

1. A reclining mechanism for a child safety seat that enables said safety seat to be used in both a forward and rearward facing position in a motor vehicle, comprising:

a seat, a base member for attachment of said seat thereto, connection means between said seat and base member for allowing movement of said seat with respect to said base member, said movement comprising a first range of reclining movement where said seat is able to move between an upright position and a first reclined position, and a second range of reclining movement where said seat further moves between said first reclined position and a second reclined position, stop means for preventing said seat moving from said first reclined position to said second range of reclining movement, and said stop means being manually operable to allow release of said seat into said second range of reclining movement, a latch to hold said seat in a plurality of positions within at least said first range of reclining movement, and a pivot connection between the rear of said seat and said base member that allows longitudinal movement of said seat with respect to said base member as well as rotational movement.

2. A reclining mechanism according to claim 1 wherein said first range of reclining movement is used when said safety seat is in a forward facing position, and said second range of reclining movement is used when said safety seat is in a rear facing position.

3. A reclining mechanism according to claim 1, wherein said stop means comprises a spring loaded release mechanism that has an abutment surface that is engaged by a portion of said seat which prevents said seat from moving into said second range of reclining movement, and said release mechanism is depressed to release said seat.

4. A reclining mechanism according to claim 1 wherein said latch comprises a manually operated latching element pivotally attached to said seat having a projection that selectively engages in one of a plurality of apertures within said base member.

5. A reclining mechanism according to claim 4 wherein said latching element is spring loaded and operated via a pull rod and handle where the handle is located at the front of said seat.

6. A reclining mechanism according to claim 1 wherein said latch comprises a guide bar attached to said seat and at least one slot in said base member within which said guide bar is located and a plurality of recesses along said slot that are engaged by said guide bar to thereby allow said seat to be held in a desired one of a plurality of positions.

7. A reclining mechanism according to claim 6 wherein said guide bar is moved from one recess to another and along said slot by lifting the front of said seat and pushing or pulling it to the required position whereupon said guide bar engages another aperture.

8. A reclining mechanism according to claim 6 wherein there are a pair of slots within said base member, each slot being engaged by an end of said guide bar.

9. A reclining mechanism according to claim 6 wherein said slots comprise a first slot portion for controlling movement of said seat in said first range of reclining movement, and a second slot portion for controlling movement of said seat in said second range of reclining movement that is connected to said first slot portion by a substantially vertical aperture, said stop means comprising the end of said first slot portion.

10. A reclining mechanism according to claim 1 further comprising a guide bar attached to said seat and at least one slot in said base member within which said guide bar locates, said slot controlling the reclining motion of said seat.

11. A reclining mechanism according to claim 10 wherein said slots comprise a first slot portion for controlling movement of said seat in said first range of reclining movement and a second slot portion for controlling movement of said seat in said second range of reclining movement that is connected to said first slot portion by a substantially vertical aperture, said stop means comprising the end of said first slot portion.

12. A reclining mechanism according to claim 10 further comprising a pair of said slots, each slot being engaged by an end of said guide bar.

13. A reclining mechanism according to claim 12 wherein said slots comprise a first slot portion for controlling movement of said seat in said first range of reclining movement and a second slot portion for controlling movement of said seat in said second range of reclining movement that is connected to said first slot portion by a substantially vertical aperture, said stop means comprising the end of said first slot portion.

14. A reclining mechanism, for a child safety seat that enables said safety seat to be used in both a forward and rearward facing position in a motor vehicle, comprising:

a seat, a base member for attachment of said seat thereto, connection member between said seat and base member for allowing movement of said seat with respect to said base member, said movement comprising a first range of reclining movement where said seat is able to move between an upright position and a first reclined position, and a second range of reclining movement where said seat further moves between said first reclined position and a second reclined position, a stop member for preventing said seat moving from said first reclined position to said second range of reclining movement, and said stop member being manually operable to allow release of said seat into said second range of reclining movement, a latch to hold said seat in a plurality of positions within at least said first range of reclining movement, and a pivot connection between the rear of said seat and said base member that allows longitudinal movement of said seat with respect to said base member as well as rotational movement.

15. A reclining mechanism for a child safety seat that enables said safety seat to be used in both a forward and rearward facing position in a motor vehicle comprising:

a seat, a base member for attachment of said seat thereto, connection means between said seat and said base member for allowing movement of said seat with respect to said base member, said movement comprising a first range of reclining movement where said seat is able to move between an upright position and a first reclined position, and a second range of reclining movement where said seat further moves between said first reclined position and a second reclined position, latch means for holding said seat in a plurality of positions within at least said first range of reclining movement, stop means for preventing said seat from moving from said first reclined position to said second range of reclining movement, and said stop means being manually operable to allow release of said seat into said second range of reclining movement, and a pivot connection between a rear of said seat and said base member that allows longitudinal movement of said seat with respect to said base member as well as rotational movement.

16. A reclining mechanism according to claim 17, wherein said slots comprise a first slot portion for controlling movement of said seat in said first range of reclining movement and a second slot portion for controlling movement of said seat in said second range of reclining movement that is connected to said first slot portion by a substantially vertical aperture, and said stop means comprises the end of said first slot portion.

17. A reclining mechanism according to claim 15, wherein said latch means includes a guide bar attached to said seat and at least one slot in said base member within which said guide bar is located, and said slot controlling the reclining motion of said seat.

18. A reclining mechanism according to claim 17, further comprising a pair of said slots, and each slot is engaged by an end of said guide bar.

19. A reclining mechanism according to claim 18, wherein said slots comprise a first slot portion for controlling movement of said seat in said first range of reclining movement and a second slot portion for controlling movement of said seat in said second range of reclining movement that is connected to said first slot portion by a substantially vertical aperture, and said stop means comprises the end of said first slot portion.

* * * * *